United States Patent [19]

Lin

[11] Patent Number: 5,580,452
[45] Date of Patent: Dec. 3, 1996

[54] MOVING LIQUID MEMBRANE MODULES

[75] Inventor: ZhenWu Lin, Acton, Mass.

[73] Assignee: LSR Technologies, Inc., Acton, Mass.

[21] Appl. No.: 349,051

[22] Filed: Dec. 2, 1994

[51] Int. Cl.$^6$ .................................................. B01D 63/00
[52] U.S. Cl. ............................. 210/321.74; 210/321.84; 210/497.1; 210/493.4; 210/643; 96/5
[58] Field of Search ....................... 210/321.74, 321.83, 210/497.1, 640, 651, 493.4, 643; 95/44.47; 96/5

[56] References Cited

U.S. PATENT DOCUMENTS

| | | | |
|---|---|---|---|
| 3,872,014 | 3/1975 | Schell | 210/321.74 |
| 3,962,095 | 6/1976 | Luppi | 210/321.74 |
| 4,750,918 | 6/1988 | Sirkar . | |
| 4,762,535 | 8/1988 | Pez et al. | 95/44 |
| 4,789,468 | 12/1988 | Sirkar | 210/137 |
| 4,921,612 | 4/1990 | Sirkar | 210/644 |
| 4,973,434 | 11/1990 | Sirkar et al. . | |
| 4,997,569 | 3/1991 | Sirkar | 210/637 |
| 5,034,126 | 7/1991 | Reddy et al. | 210/321.74 |
| 5,096,584 | 3/1992 | Reddy et al. | 210/321.74 |
| 5,137,637 | 8/1992 | Korin | 210/321.74 |
| 5,154,832 | 10/1992 | Yamamura et al. | 210/321.74 |
| 5,167,825 | 12/1992 | Lipski et al. | 210/640 |

OTHER PUBLICATIONS

Teramoto, et al. Development of Spiral–Type Flowing Liquid . . . Separation Science and Technology, 24(12 & 13), pp. 981–999, 1989.

Mark Antonio, Dean Tsou, Silver Ion Coordination in Membranes . . . Ind. Eng.Chem.Res. 1993, 32, 273–278.

Kreulen, et al. Selective removal of H2S from sour gases . . . Part II Journal of Membrane Science, 82(1993) 185–197, Elsevier Science Publishers.

Davis, et al,; Facilitated Transport Membrane Hybrid Systems . . Separation Science and Technology, 28(1–3), pp. 463–476 (1993).

Kreulen, et al,;Selective removal of H2S from sour gas . . Part I Journal of Membrane Science, 73 (1992)293–304 Elsevier Science Publishers.

Boyadzhiev,L.;Liquid Pertraction or Liquid Membranes–State of the Art Separation Science and Technology, 25(3),pp. 187–205, 1990.

Teramoto, et al.;Separation of Ethylene from Ethane by a Flowing Liquid . . Journal of Membrane Science, 45(1989) 115–136,Elsevier Science Publishers.

*Primary Examiner*—Ana Fortuna
*Attorney, Agent, or Firm*—Lorusso & Loud

[57] ABSTRACT

The present invention relates to an improved design for a moving liquid membrane module. In one embodiment, the tubular or hollow fiber module, at least one tubular or hollow fiber element is contained within a housing. This element comprises an inner tubular membrane and an outer tubular membrane. The element comprises a first tubular membrane located within a second tubular membrane of larger diameter. The membrane liquid is continuously passed through annular gap between the two tubular membranes. The feed fluid is continuously passed through the lumen of the inner tubular membrane and the purge or strip fluid is continuously passed over the outer surface of the outer tubular membrane. In a second embodiment, the spiral wound moving liquid membrane module, a spiral wound cartridge is incorporated into a housing. The cartridge is formed by wrapping at least one permeant depletion channel, one permeant enrichment channel and one membrane liquid channel around a core tube. The permeant enrichment and depletion channels are sealed by adhesives and the fluids flowing therein may be counter-current or cocurrent with respect to each other. Membrane liquid is continuously passed between the permeant depletion and enrichment channels which are wound around the core tube, thereby, creating a counter-current or cocurrent flows between the membrane liquids and the liquids flowing in the permeant depletion and enrichment channels.

10 Claims, 9 Drawing Sheets

MOVING LIQUID MEMBRANE MODULES

FIELD OF THE INVENTION

The present invention relates to an apparatus for use in connection with a moving liquid membrane process for selective transport of a permeant from a feed fluid mixture which comprises the permeant and at least one other component to a purge fluid thereby separating the permeant from the feed fluid mixture.

BACKGROUND OF THE INVENTION

Supported liquid membranes have been known in the art for several decades as a potential method for the separation of various permeants, being a gas or solute, from a feed-fluid mixture. These liquid membranes usually involve the incorporation of a membrane solution into the micro-pores of a porous membrane. The membrane draws up the solution into its pores so that the pores act as a selective membrane for selective separation of the permeant from a feed-fluid. That is, the membrane solution is selectively chosen so that the permeant will pass through the solution in the micro-pores thereby separating the permeant from the feed-fluid.

The geometry of the microporous support membrane can be flat sheet, hollow fiber and spiral-wound. Membrane modules containing the above three geometries are commercially available. A flat sheet module is less attractive due to its low membrane area/volume ratio. Hollow fiber and spiral-wound modules are more desirable because they have a higher membrane area/volume ratio and have been used in many industries for gas separations, ultrafiltration and reverse osmosis, etc. They can also be used to form the supported liquid membranes by incorporating membrane liquid in their pores.

There are numerous attempts to use conventional hollow fiber modules for liquid membrane applications. The conventional spiral-wound modules used in reverse osmosis and ultrafiltration cannot be used due to their structural limitations. A certain modified spiral-wound module is amenable to the liquid membrane applications. For example, U.S. Pat. No. 5,034,126 to Reddy et al. teaches a countercurrent dual-flow spiral-wound structure. This structure has a feed pipe separated into compartments which are axially connected to a porous spacer surrounded by a membrane envelope. A separate permeate pipe is immediately adjacent in a parallel configuration to the fluid feed pipe and is in fluid communication with a different porous spacer sheet. A feed stream containing a permeant is forced through the module through the feed pipe. As the feed stream moves through the spiral-wound membrane, the permeant passes through the membrane into the permeant passageway. The permeant is removed from this passageway by means of a sweep fluid.

Although these hollow fiber and modified spiral-wound structures provide a useful solution to the problem of limited membrane surface area, their commercial applications are prohibited due to the common problems, the loss and degradation of the membrane solutions in the pores, which cause performance instability and short life span of conventional supported liquid membranes.

There are extensive efforts to improve the supported liquid membrane's stability and reliability. For example, U.S. Pat. No. 4,750,918 to Sikar teaches a hollow-fiber-contained liquid membrane structure in which two independent sets of hollow fibers are incorporated in a shell housing. A selective-permeation liquid(membrane solution) is introduced into the shell housing to form a permeation transfer chamber. One set of the fibers serves as a gas-depletion channel and the other as a gas-enrichment channel. Both channels pass through the permeation chamber and are separated by the liquid in the chamber. The selective-permeation liquid in the permeation chamber contacts the porous walls and facilitates the transfer of a selected gas from a feed-gas mixture in the gas-depletion channel to the gas-enrichment channel. A similar structure is taught in U.S. Pat. No. 4,789,468, also to Sikar, which incorporates pressure regulators between a feed and solution channel and an extractant channel to substantially immobilize the interface between the channels for liquid separations.

Although these unique liquid membrane structures are theoretically sound and have better stability by replenishing the lost membrane solution in the permeation chamber, several problems have been encountered in connection with adapting them for large-scale practical use. For instance, the structural characteristics of the membrane channels are not well defined. It is difficult to obtain uniform inter-distributions of the permeant depletion and enrichment channels in the permeation chamber, resulting in the non-uniform effective liquid membrane thickness and permeability. Furthermore, the permeability can be relatively low due to the relatively thick and stagnant liquid between the depletion and enrichment channels.

Accordingly, attempts have been made to increase permeability by creating a continuously flowing membrane liquid, thereby generating three independent and simultaneously flowing fluid channels. This is called a moving liquid membrane system. One example of such a system is provided in an article by Teramoto et al. in the *Journal of Membrane Science*, 45 (1989) 115–136 (Elsevier Science Publishers B.V., Amsterdam). Teramoto teaches a flat sheet configuration in which a liquid membrane solution flows in a thin channel between two spaced microporous membranes. Although increased permeability is achieved, the membrane area limitations discussed above have limited the use of such a structure in commercial applications.

In view of this, moving liquid membrane structures have been incorporated into spiral wound modules. An example of a spiral wound moving liquid membrane structure is described in an article by M. Teramoto et al. in *Separation Science and Technology*, 24(12 & 13), pp. 981–999, 1989. Teramoto discloses a spiral wound structure in which the liquid membrane solution containing a carrier flows in thin spiral wound channels between two hydrophobic microporous membranes which separate the membrane solution from a feed and a strip solution. Again, however, this structure is not amenable to commercial application since it is difficult to fabricate into a unit with industrially acceptable through-put.

OBJECTS OF THE INVENTION

Accordingly, it is an object of the present invention to provide a moving liquid membrane system which provides high capacity for use in commercial applications.

Another object of the present invention is to provide a moving liquid membrane system which provides high permeability performance for use in commercial applications.

Still another object of the present invention is to provide a moving liquid membrane system which provides high surface area in a limited volume for use in commercial applications.

SUMMARY OF THE INVENTION

The present invention provides a unique structure for use in connection with moving liquid membrane process which is particularly suitable for commercial use. In one embodiment, a tubular moving liquid membrane module, the module housing is adapted to contain at least one tubular moving liquid membrane element. The element includes a first tubular membrane located within a second tubular membrane with an annular gap defined between the first tubular membrane and the second tubular membrane. The first (inner) tubular membrane is longer than the second tubular membrane so that its ends extend axially out of the ends of the second tubular membrane. Also, a screen spacer/support may be used between the membranes to provide mechanical support and create turbulence in the liquids flowing through the membranes.

The lumen of the first tubular membrane is used as fluid passage way for feed fluid, and the outer surface of the second tubular membrane is used as fluid flow surface for either the purge or strip fluid. The membrane liquid flows through the annular gap which serves as membrane liquid passage way.

The module also includes four tube sheets, two at each end of the housing. At one end of the housing, a first tube sheet extends between the housing and the exterior surface of a first end of the first tubular membrane, and a second tube sheet extends between the housing and the exterior surface of a first end of second tubular membrane. The space between the first and second tube sheets is used as a membrane liquid intake manifold for providing a membrane liquid from a membrane liquid inlet port on the housing to the annular gap.

At the other end of the housing, a third tube sheet extends between the housing and the exterior surface of a second end of the first tubular membrane, and a fourth tube sheet extends between the housing and the exterior surface of a second end of the second tubular membrane. The space between the third and fourth tube sheets is used as a membrane liquid outlet manifold for removing a membrane liquid from the annular gap at a membrane liquid outlet port on the housing.

The space between the first tube sheet and the housing is used as a feed fluid intake manifold for providing a feed fluid from a feed fluid inlet port on the housing to the fluid passage way. Likewise, the space between the third tube sheet and the other end of the housing is used as a feed fluid outlet manifold for removing a feed fluid from the fluid passage way to a feed fluid outlet port on the housing.

A purge fluid inlet port is formed on the housing between the second tube sheet and a fourth tubes sheet. This port facilitates the introduction of a purge fluid from a purge fluid to the fluid flow surface. The purge fluid outlet port is located on the other side of the housing, spaced from the purge fluid inlet port. The purge fluid outlet port facilitates the removal of the purge fluid from the fluid flow surface at a purge fluid outlet port on the housing.

The module may also be operated without a purge fluid. In this mode the purge fluid inlet port is closed and a vacuum pump and/or a condenser is connected to the purge fluid outlet port to draw the permeant out of the module from the permeant-enrichment channels.

In addition, the Tubular or Hollow Fiber module includes various connections to the element for providing independent and simultaneous flowing of a feed fluid through the fluid passageway, a membrane liquid through the membrane liquid passageway, and a purge or strip fluid upon the fluid flow surface. These connections include differential pressure controllers, fluid pumps, and a membrane liquid reservoir.

In a second embodiment, a spiral wound moving liquid membrane module, the module housing is adapted to contain a spiral wound moving liquid membrane cartridge. The cartridge includes a core tube with a feed fluid channel, a purge fluid channel and two membrane liquid channels wrapped around it. The membrane liquid channel is located between the purge fluid channel and the feed fluid channel.

In addition, at least two tubular fluid ports extend from one end of the housing to first end of the core tube, and at least two tubular fluid ports extend from the other end of the housing to the second end of the core assembly. At least one of the ports at each end of the housing is used as a feed fluid port in fluid communication with the feed fluid channel. The remaining ports on each end of the housing are used as purge fluid ports in fluid communication with the purge fluid channel. As in the tubular module, however, the spiral wound module may also be operated without a purge fluid. In this mode the purge fluid inlet port is closed and a vacuum pump and/or a condenser is connected to the purge fluid outlet port to draw the permeant out of the module from the permeant-enrichment channels.

Two end seals are fixed in the module, one on each end of the cartridge. The first end seal extends between the housing and the exterior surface of cartridge to close the space between the cartridge and the housing from fluid flowing from end to end in the module. The space between the first end seal and the first end of the housing, is used as a membrane liquid intake manifold for providing a membrane liquid to the membrane liquid channel from a membrane liquid inlet port on the housing. The end seal prevents the membrane liquid from flowing anywhere but the membrane liquid channel located between the purge and strip fluid channels all of which are wrapped around the core tube. The membrane liquid does not flow into the purge and strip channels since their edges which are exposed at the end of the core tube are sealed with an adhesive.

The second end seal is at the other end of the cartridge, and like the first end seal extends between the housing and the exterior surface of the cartridge. The space between the second end seal and a second end of the housing defines a membrane liquid outlet manifold for removing the membrane liquid from the membrane liquid channel through a membrane liquid outlet port on the housing. An antitelescoping device, which is commonly used in spiral-wound cartridges, can be combined with the second end seal to prevent the cartridge from telescoping.

Finally, various connections are made for providing independent and simultaneous flowing of a purge fluid through the purge fluid channel, a feed fluid through the feed fluid channel, and a membrane liquid through the membrane liquid channel.

BRIEF DESCRIPTION OF THE DRAWING

Preferred embodiments of the invention are described below in reference to the following figures wherein like numerals represent like parts.

DETAILED DESCRIPTION OF THE INVENTION

Figure 1:
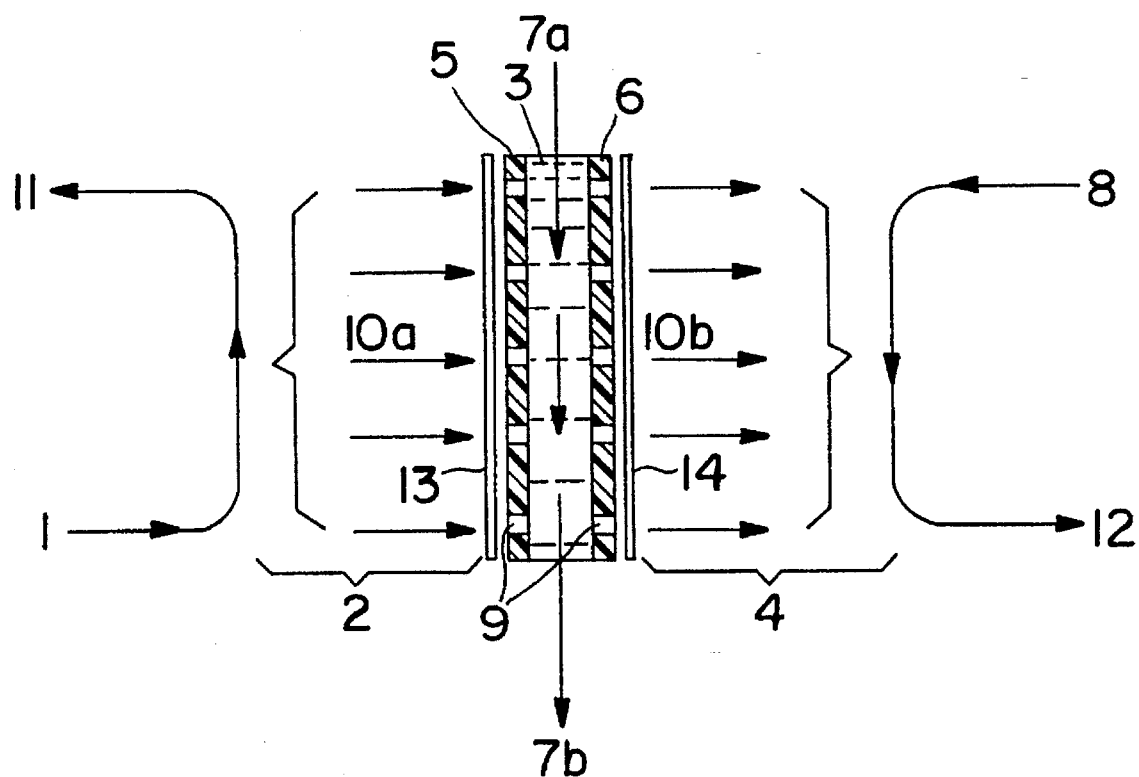
FIG. 1: is a general illustration of the elements of a moving liquid membrane incorporated into the present invention.

The structure of a Moving Liquid Membrane System is generally depicted in FIG. 1. A feed fluid 1 passes through the permeant depletion channel 2 defined on one side of the Moving Liquid Membrane channel 3 (MLM). On the other side of the MLM a permeant-enrichment channel is defined through which a purge or strip fluid 8 flows. The MLM separates the permeant-depletion channel from the permeant-enrichment channel and prevents direct communication between the feed and purge fluids. These three channels form a permeation element which permits the selective transport of a permeant 10a, 10b from feed fluid to purge fluid 8 resulting in a permeant depleted feed fluid 11 and a permeant enriched purge fluid 12.

The porous walls 5, 6 serve as interface media for selectively passing the permeant between the feed fluid 1, the moving membrane liquid 7a, 7b, and purge fluid 8. These walls may or may not be wetted by the moving membrane liquid, and the pores 9, in the walls may be filled with any of the three fluids; feed fluid, membrane liquid, or purge fluid.

The porous wall 5 on the interface of feed fluid and membrane liquid is designated as the "feed-side membrane." In the present invention, the feed-side membrane can be polymeric, metallic or ceramic materials, or a composite of any two. It can be hydrophobic or hydrophilic. The nominal pore size of the membrane can be up to 0.5 micron. The porous wall 6 on the interface of the membrane liquid and purge/strip fluid is called the "permeant-side membrane." In the present invention, this membrane can be hydrophobic or hydrophilic with a nominal pore size up to 0.5 micron. Several types of commercially available membranes may be used including:

1. Porous polypropylene membranes with less than 0.5 micron pore size, such as:
   Celgard membrane from Hoechst Celanese Corporation, Charlotte, N.C.,
   Metrical PP membrane from Gelman Sciences, Ann Arbor, Mich.,
   Microporous sheet from Tokuyama Corporation, 4-5 Nishi-Shinbashi, 1-Chome, Minato-Ku, Tokyo 105, Japan;
2. Porous PTFE membranes:
   Goretex PTFE membrane from W. L Gore and Associates Inc., Elkton, Md.,
   Fluoropore membranes from Millipore Corporation, Bedford, Mass.;
3. Other membranes:
   Porous PVDF membranes,
   Porous polyester membranes,
   Porous polyethylene membranes, and
   Porous nylon membranes;
4. Membranes obtained from modification of those above.

Also, in each of the three channels there may be one or more screen spacers/supports 13, 14. The screen has dual purposes; it offers mechanical support for the feed-side and purge/strip-side membranes and creates turbulence as the fluids flow through them. The preferred screen materials are polymers, such as polypropylene, polyethylene, nylon and epoxy-coated nylon. The screen can be nonwoven and woven. Usable screen materials include:

1. Naltex nettings with greater than 7 strands per inch from Nalle Plastics, Inc., Austin, Tex.;
2. Tricot or GUILTEC R0 channel fabric;
3. Polypropylene square net offered by Conwed Plastics, Minneapolis, Minn.; and
4. Polypropylene monofilament screen fabrics with greater than 20 mesh counts per inch offered by TETKO, Inc., Briarcliff Manor, N.Y.

The selectivity of the system is determined by the membrane liquid 7a, 7b which may or may not contain a facilitator (or carrier). The facilitator can selectively and reversibly react or complex with the permeant. When a facilitator (carrier) is incorporated in the membrane liquid, the selective transport process is called facilitated or carrier-mediated transport. When there is no facilitator, the selective permeation of the permeant is accomplished by favorable partition/solution of the permeant into the membrane liquid. Examples of such selective separation/permeation processes include:

Selective Gas Separations

1. Olefin separations from olefin/paraffin mixture (i.e., ethane and ethylene mixture) using silver salts as carrier in aqueous solution.

2. Oxygen separation from air using a cobalt-based organometallic compound as carrier.

3. $H_2S$ and $CO_2$ removal using alkanolamines as carrier in aqueous solution.

4. Selective $H_2S$ removal from $H_2S$ containing gaseous streams with a tertiary amine or hindered amine as carrier in aqueous or non-aqueous solution.

5. $SO_2$ removal from the flue gas using alkaline aqueous solutions containing NaOH, $NaHSO_3$, or $Na_2S_2O_5$, etc.

6. Gas or air dehydration using glycols or lithium chloride solutions as membrane liquid.

Selective Liquid Separations

1. Heavy metal (such as Cu, Zn, Pb, Cd, Ni, Pd, etc.) removals from aqueous streams with metal extractants (such as LIX series, Acorga series, crown ethers, etc.) incorporated in the membrane liquid as carrier.

2. Radionuclides (such as Cs, Sr, I-129, Tc-29, Se-79, etc.) removal from nuclear waste streams using organic solution containing ligand-type extractants as membrane liquid.

3. Alkene/Aromatic/Alkane-separations using silver containing solution as membrane liquid.

Preferred Embodiment #1

Figure 2:
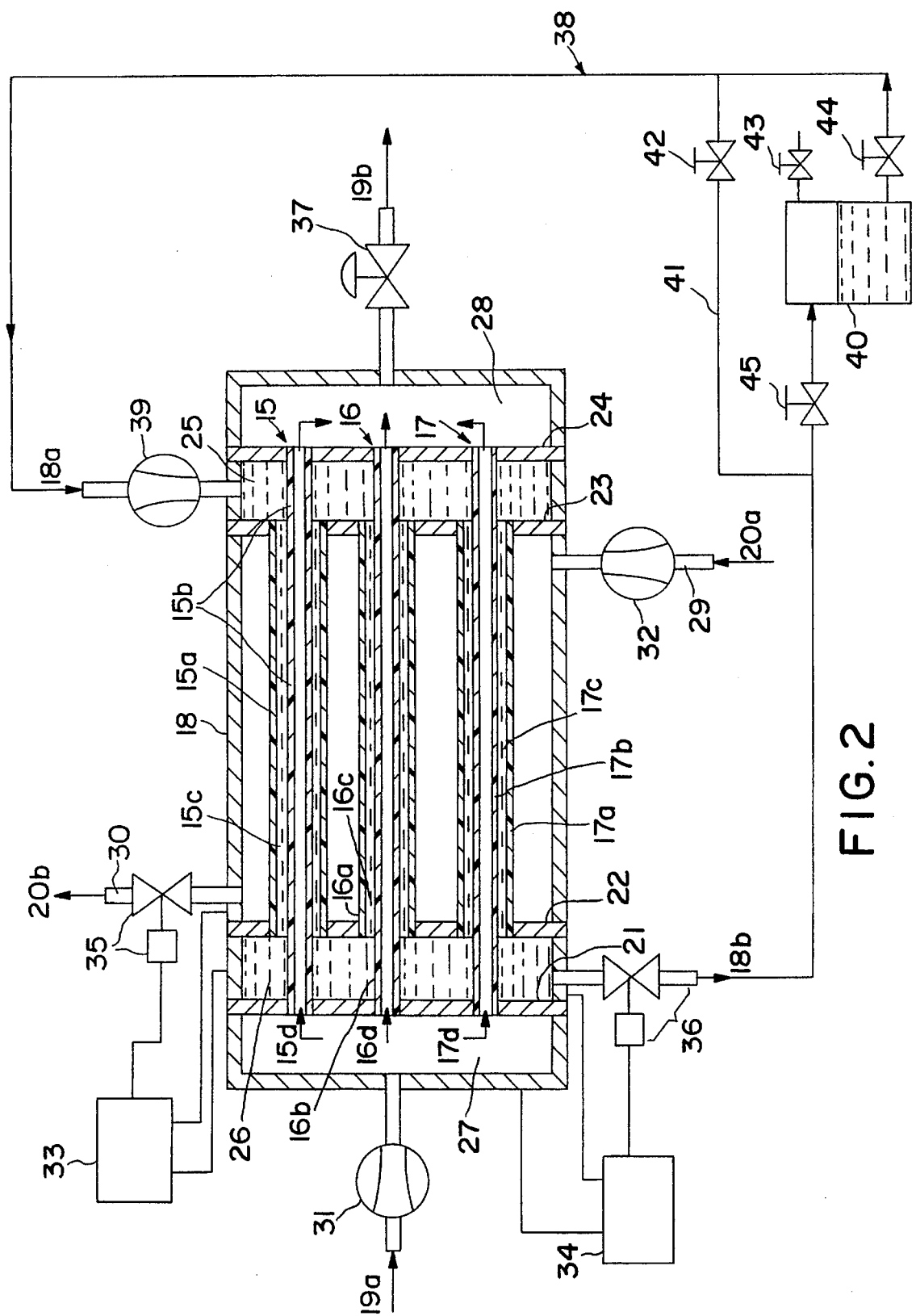
FIG. 2: is a cut-away view of the first embodiment incorporating a tubular or hollow fiber moving liquid membrane system.
Figure 3:
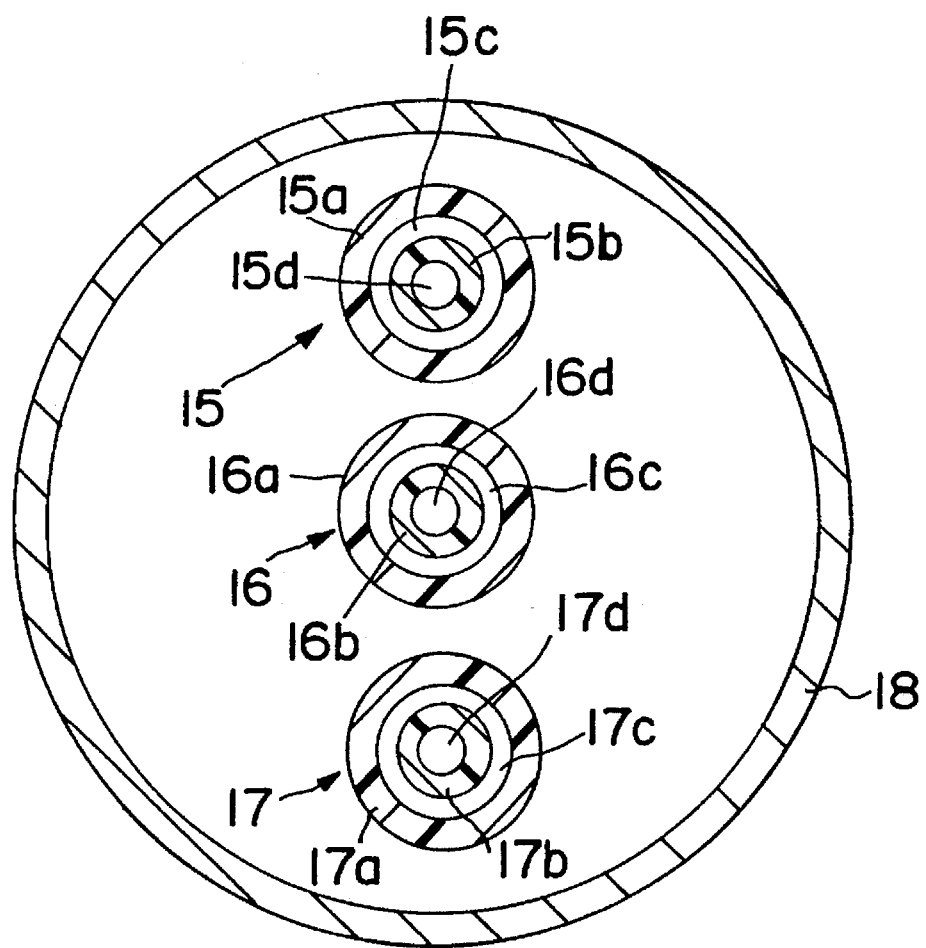
FIG. 3: is a cross section view of the tubular or hollow fiber moving liquid membrane module of the first embodiment depicted in FIG. 2.

FIGS. 2 and 3 depict a Tubular or Hollow Fiber Membrane Module. Referring to FIG. 2, the moving liquid membrane module is formed by combining one or more membrane elements 15, 16, 17 in a module housing 18. Each membrane element includes two tubular or hollow fiber membranes, 15a, 15b, 16a, 16b, 17a, 17b with different diameters. As shown also in FIG. 3, the tube or hollow fiber with the smaller diameter, e.g. 15b, is located within the larger one 15a forming an annular gap 15c between the tubes.

Referring still to FIG. 2, the moving liquid membrane is formed by passing a selective-permeation membrane liquid 18a, 18b through the annular gaps 15c, 16c, 17c between the two tubes or fibers in each element. The annular gap may or may not contain a screen/spacer which is absent in FIGS. 2 and 3. The feed fluid 19a, 19b flows through the lumen side 15d, 16d, 17d of the inner tube of each element, while the purge fluid 20a, 20b flows on the outside surface of the outer tube 15a, 16a, 17a, or vice versa.

There are four tube sheets in a module 21, 22, 23, 24, two on each end. The membrane liquid 18a, 18b enters the module from one end between the two tube sheets 23, 24 at the membrane liquid inlet manifold 25 the fluid distributes into the annular gaps of the membrane elements 15c, 16c, 17c and then exits at the other end between the two tube sheets 21, 22, at the membrane liquid outlet manifold 26.

The feed fluid 19a, 19b enters the module from one end of the module at the feed inlet manifold 27, distributes into the lumen side 15d, 16d, 17d of each inner tube (or fiber) in the module, and then exits the tubes into the feed outlet manifold 28 on the other end of the module. The purge flow 20a, 20b enters the module through a port 29 in the housing shell 18, flows along the outer surfaces of the outer tube/ porous membrane 15a, 16a, 17a of each element, and exits the module through another port 30 on the shell. The entry and exit ports are apart from each other and close to the ends of the module.

A pump or compressor 31, 32 may be needed in both the permeant-depletion channel and permeant-enrichment channel to transport fluids in and through the module.

The module also includes pressure controllers 33, 34 and regulators 35, 36, 37 between the purge fluid and membrane liquid channels and membrane liquid and permeant-depletion channels. There is a membrane circulation system 38 which includes a liquid pump 39, membrane liquid reservoir 40, circulation bypass 41 and pressure regulators, 42, 43, 44, 45.

In operation, the module preferably contains a plurality of tubular or hollow fiber elements, but may contain only one element. The purge fluid, feed fluid, and membrane liquid are forced through their respective channels in a continuous and simultaneous fashion. Since the fluid channels are independent of each other, a moving liquid membrane is established within each element of the module.

As the feed fluid passes through the inner tube, the permeant is separated from the feed fluid and transferred through the membrane liquid (which may or may not contain a carrier) to the purge/strip fluid. The passage of the permeant to the purge fluid (permeate) is driven by the permeant's differential chemical potential across the moving liquid membrane. The membrane liquid is continuously cycled through the membrane liquid channel as long as there is no degradation in the carrier concentration if a carrier is used. A membrane liquid reservoir is provided between the membrane liquid inlet and outlet ports for storing the circulation membrane liquid. A bleed of membrane liquid may be drawn and replaced with fresh membrane liquid.

The feed and purge fluids may be passed through the elements in a "once through" mode, or a fixed quantity may be continuously cycled through the elements to remove the permeant from a fixed amount of feed fluid. In the "once-through" mode steady streams of purge and feed fluids are passed through the module and not recycled. In either mode, the permeant enriched strip fluid is removed through the port 30 on the housing of the shell.

In the alternative, the module may be operated by closing the purge fluid inlet port and using no purge fluid. In this mode, the purge fluid outlet port may be connected to a standard vacuum pump and/or a condenser to draw the permeant out of the module from the permeant enrichment channels.

Preferred Embodiment #2

Figure 4:
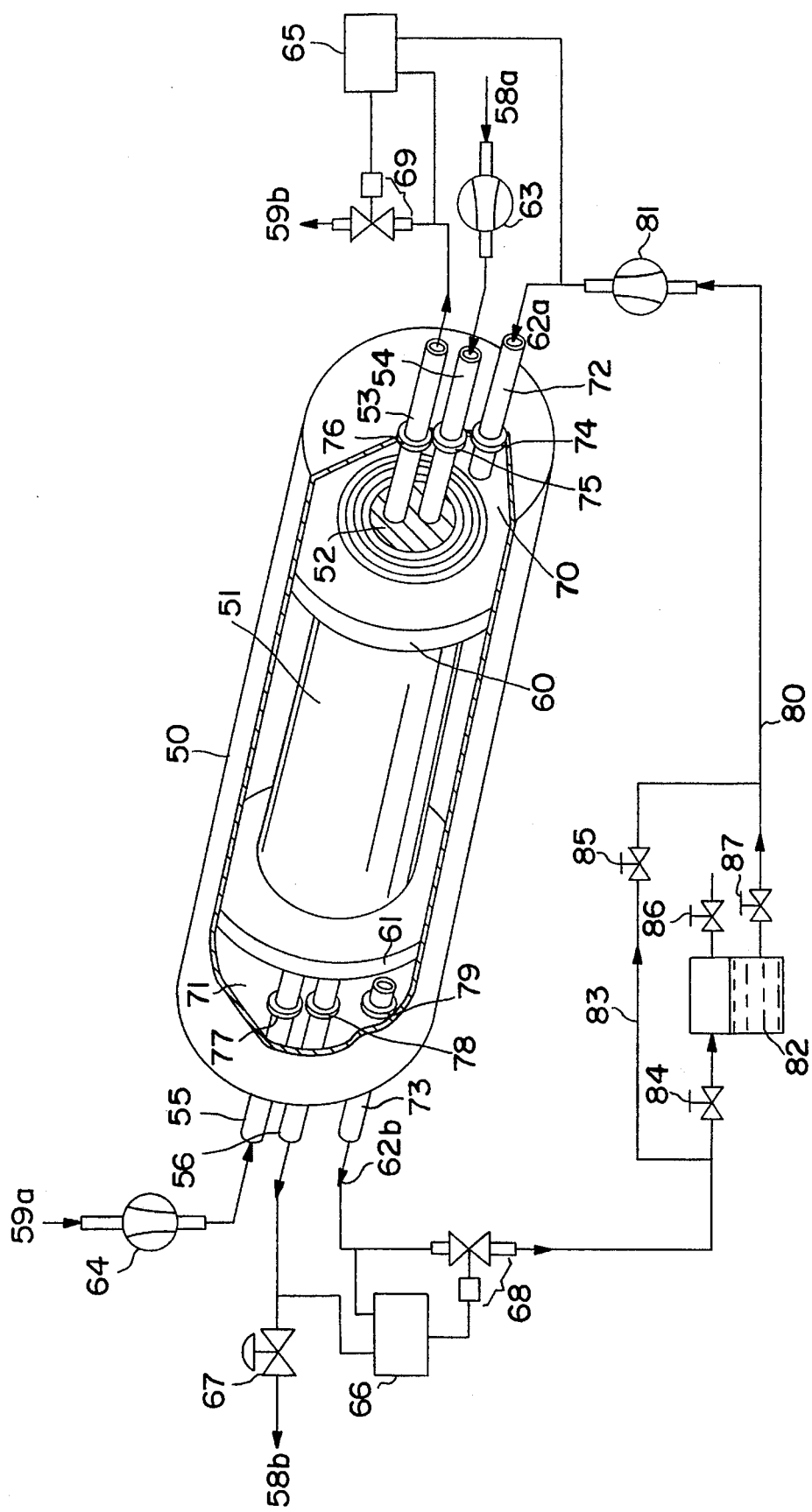
FIG. 4: is a cut-away view of a second embodiment involving a spiral wound moving liquid membrane module.
Figure 5:
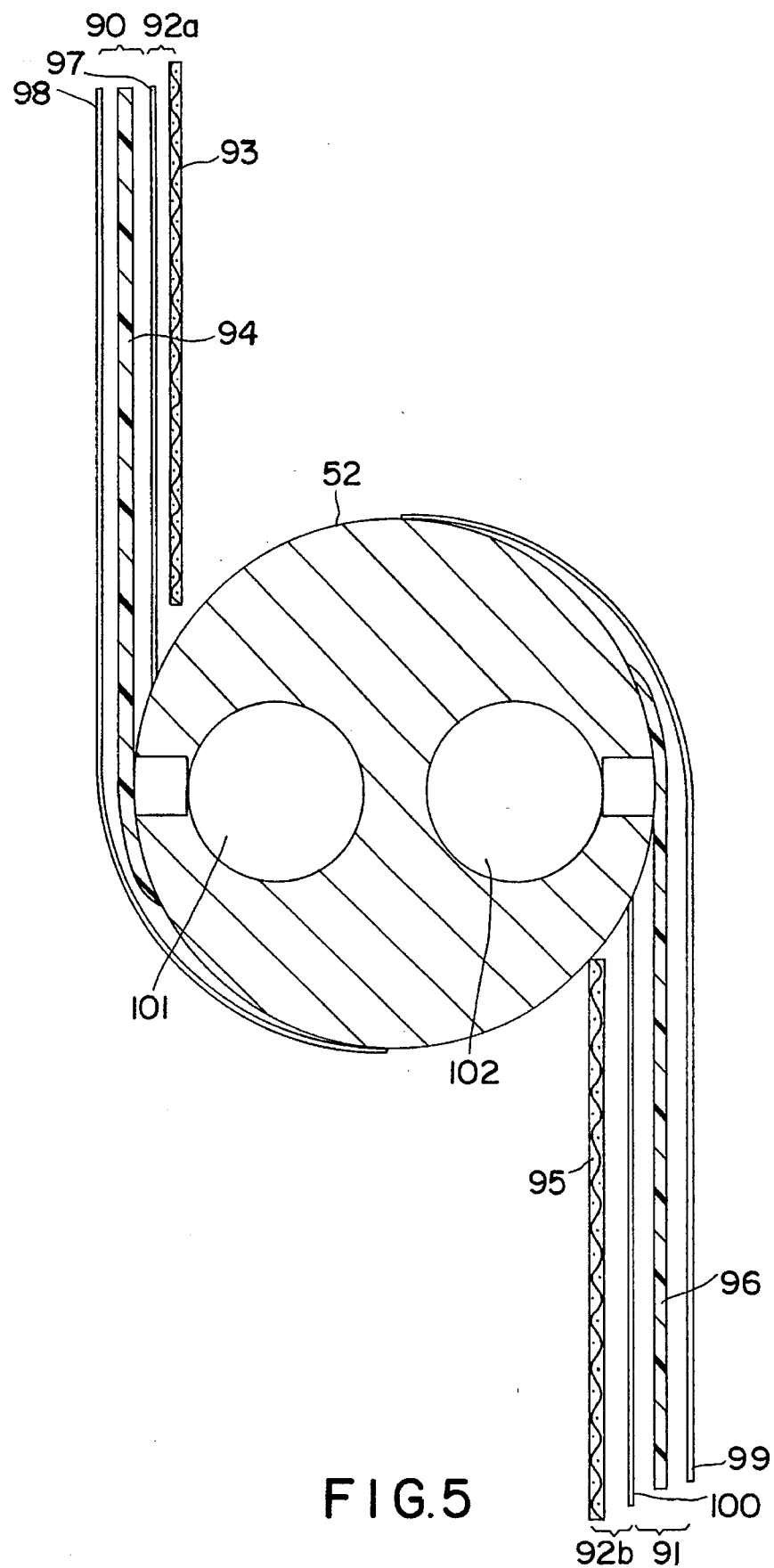
FIG. 5: is a cross-sectional view of a core tube or assembly formed from a solid rod stock.

Referring to FIG. 4, a spiral wound module is shown which includes a module housing 50, and a spiral wound cartridge 51. The cartridge is formed by wrapping a permeant-depletion channel 90, permeant-enrichment channel 91 and membrane liquid channel 92a, 92b around a core tube or core tube assembly 52, as shown in FIG. 5. Spacers 93, 94, 95, 96 are placed in each channel between the porous supports 97, 98, 99, 100 to provide mechanical support, create turbulence in the fluids, and to define the thickness of each channel. Preferably, the membrane liquid channel thickness ranges from 0.013 inches (0.3 mm) to 0.125 inches (3.3 mm). Both feed and permeant channels can have thicknesses between 0.013 inches (0.3 mm) and 0.25 inches (6 mm).

Figure 6:
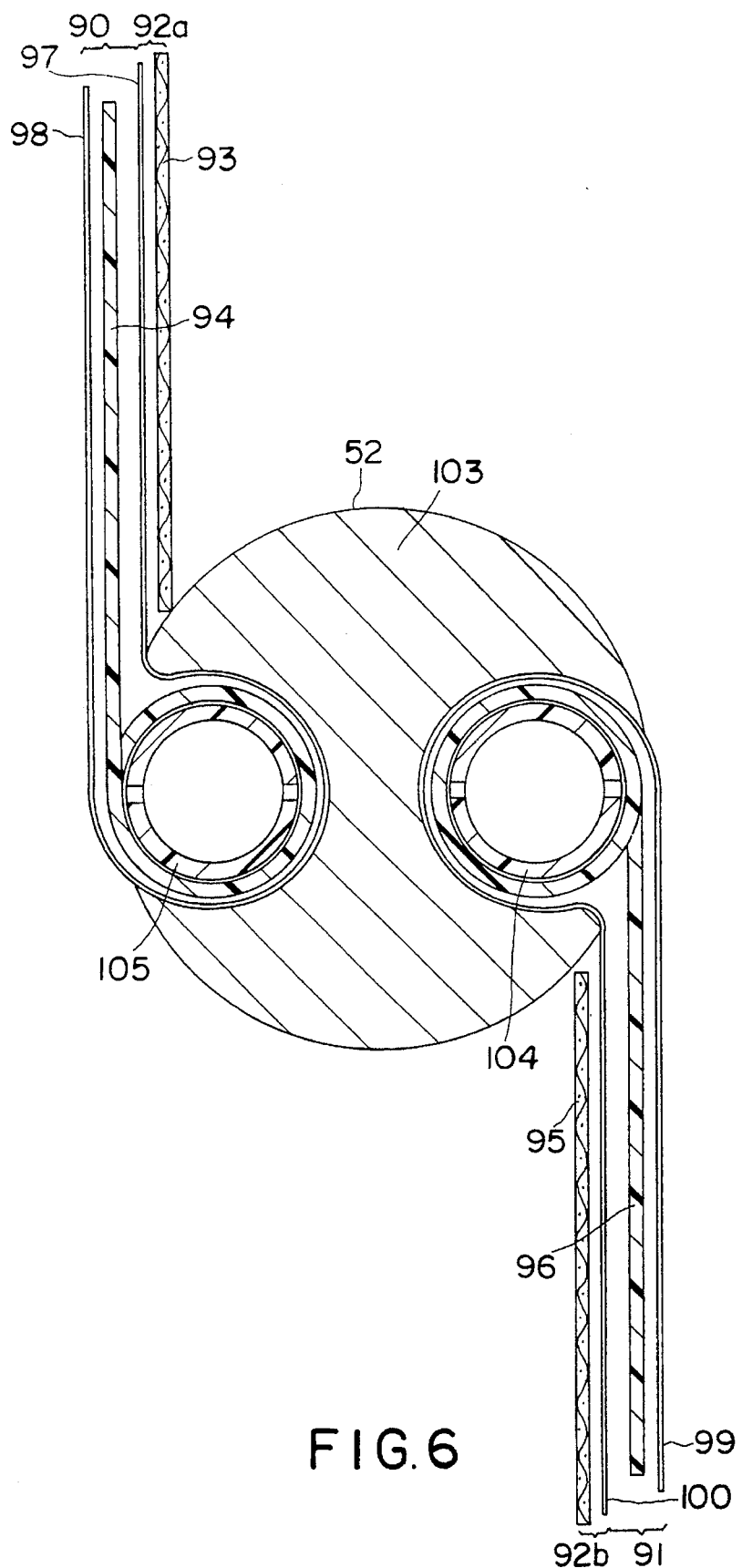
FIG. 6: is a cross-sectional view depicting a core tube template with independent purge and feed tubes formed therein.
Figure 7:
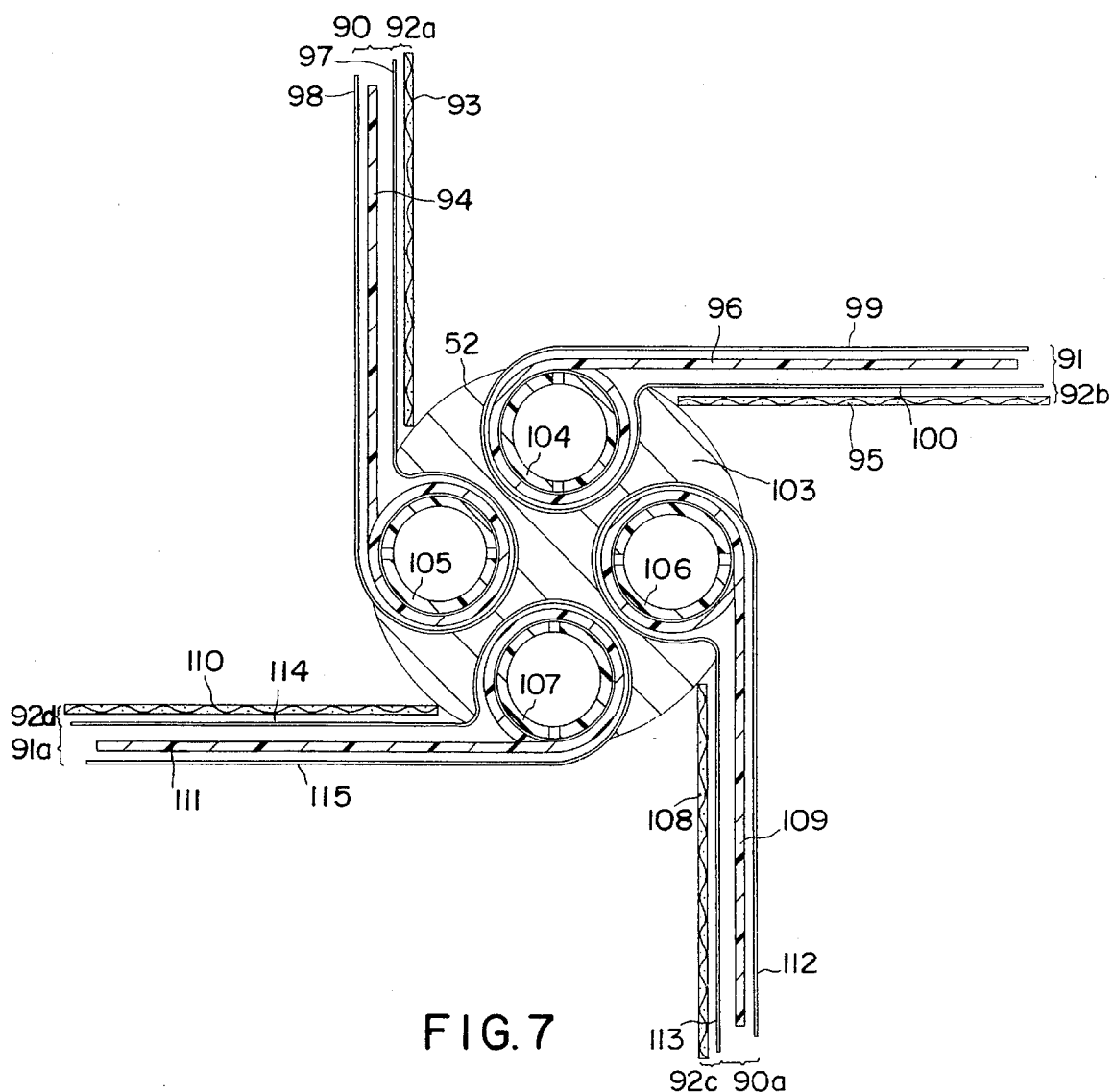
FIG. 7: is a cross-sectional view of depicting a core tube template with two independent purge tubes and two independent feed tubes formed in a circumferentially alternating fashion.

In one embodiment, the core tube or assembly can be formed from a solid rod stock with feed fluid 101 and purge fluid ports 102 formed integrally therein, as shown in FIG. 5. An alternative structure is illustrated in FIG. 6 where the core tube assembly is formed from a template 103 into which independent purge 104 and feed fluid 105 tubes are placed. The template forms a round center for the spiral-wound cartridge and supports the purge and feed tubes. Once the purge and feed fluid tubes are inserted into the template, the membrane channels are wrapped around the template to form the spiral wound cartridge. The template can also be designed to accommodate two or more independent purge fluid tubes 104, 107 and two or more independent feed fluid tubes 105, 106 in a circumferentially alternating configuration, as shown in FIG. 7. Each tube contains its own independent channels defined by spacers 93–96, 108–111 and porous supports 97–100, 112–115 which are wrapped around the template 103 to form the cartridge. Preferably, the core tube or core tube assembly has a diameter size in the range of 1–4 inches, and module housing has an inner diameter in the range of 4–36 inches.

Turning again to FIG. 4, there are at least four ports 53, 54, 55, 56 on the core tube, two on each end. The feed fluid 58a, 58b enters from one port 54 on one end and exits from one port 56 on the other end. The other two ports 53, 55 are the inlet and outlet of the purge/strip fluid 59a, 59b.

Figure 8:
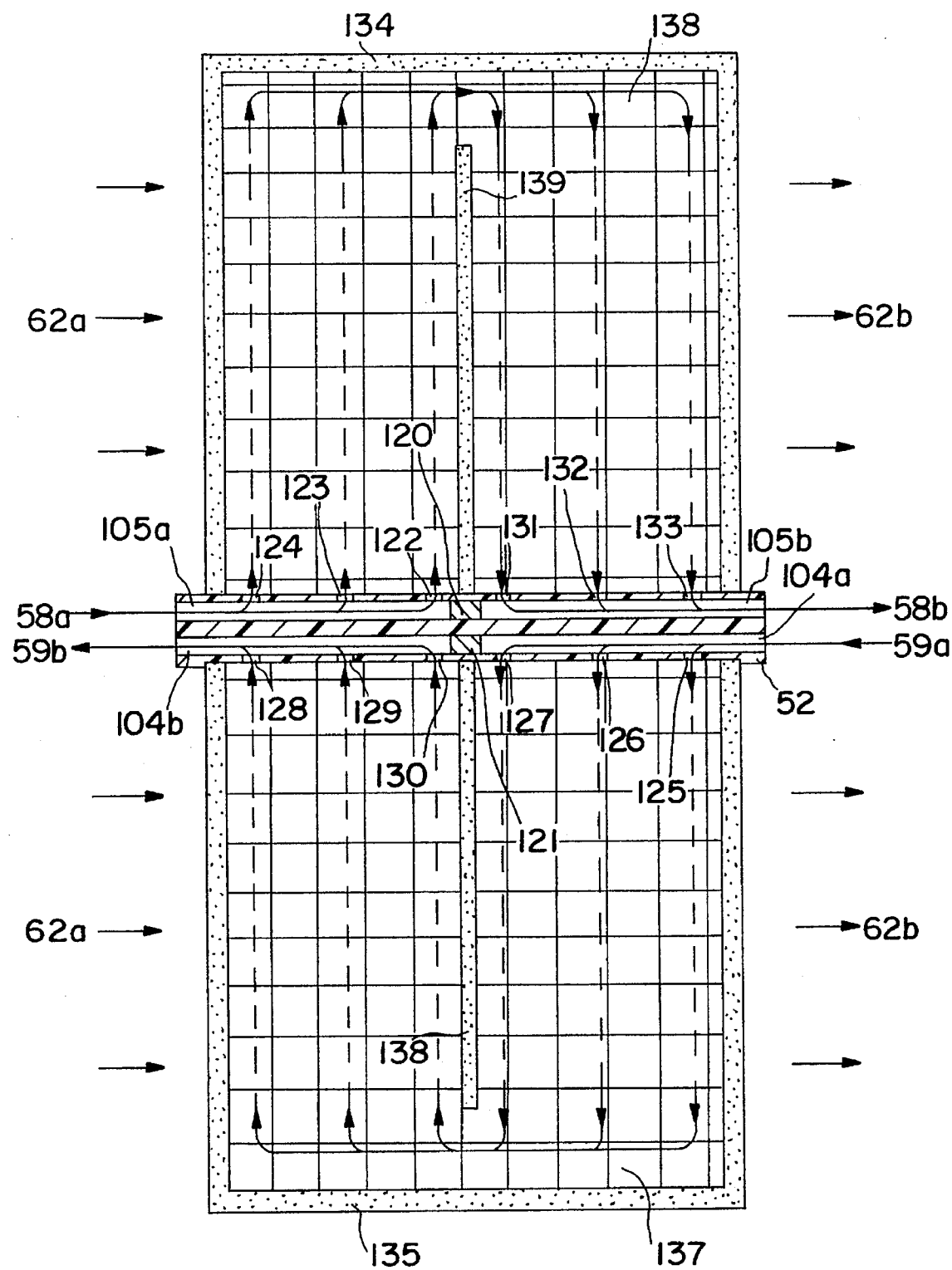
FIG. 8: is a flow illustration depicting the flows of the various fluids within the spiral wound module of the embodiment depicted in FIG. 4.
Figure 9:
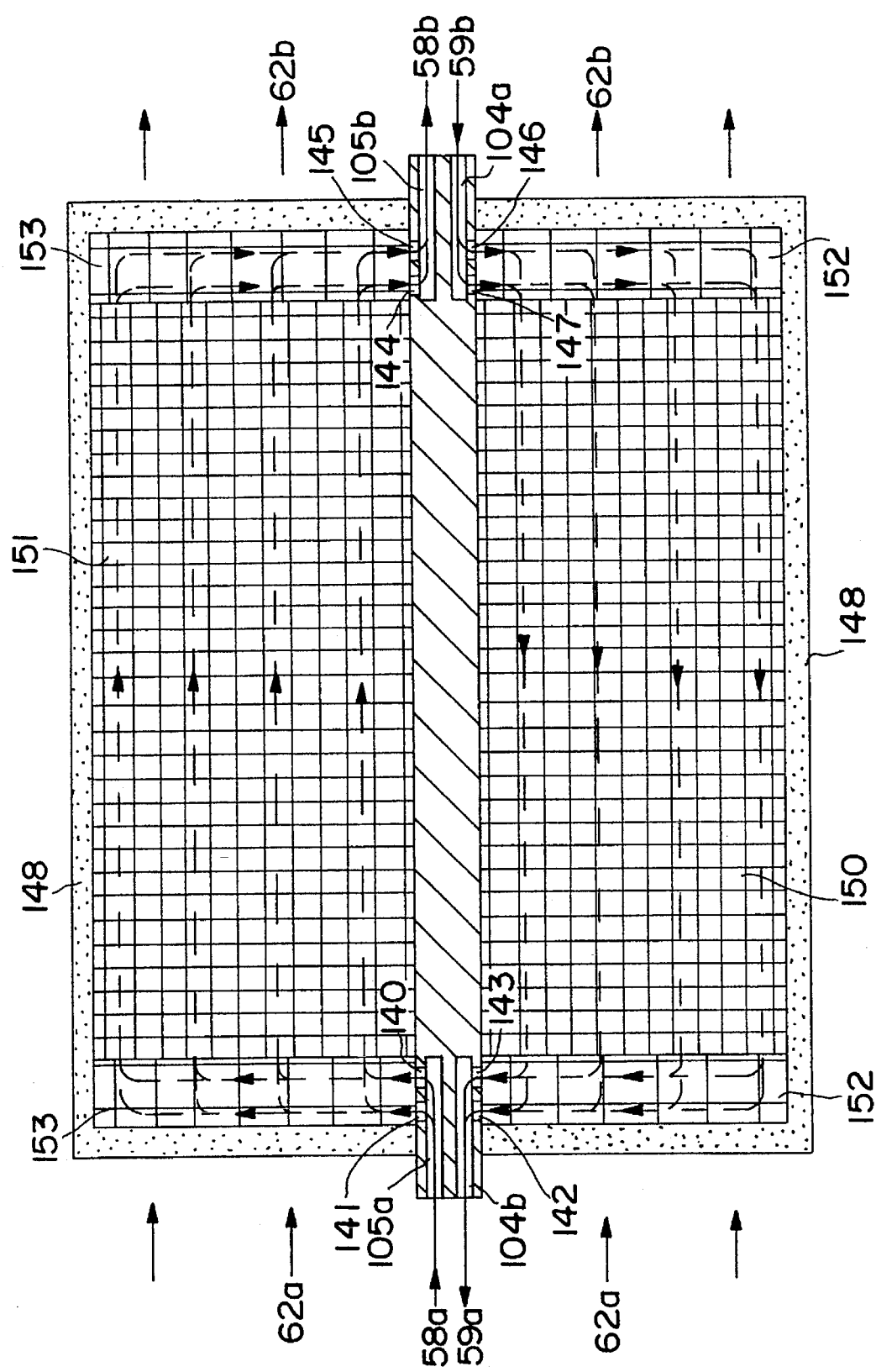
FIG. 9: is a second flow illustration depicting the flows of the various fluids within the spiral-wound module of the embodiment depicted in FIG. 4.

There are two end seals 60, 61 to plug the gaps between the spiral-wound cartridge 51 and the housing 50. The space between the end seal 60 and one end of the module defines a membrane liquid intake manifold 70, and the space between the end seal 61 and the other end of the module defines a membrane liquid outlet manifold 71. An commonly known antitelescoping device (not shown) may be combined with end seal 61 to prevent the telescoping of the cartridge. The membrane liquid 62a, 62b enters the module through a port 72 on one end of the module and exits through another port 73 on the other end of the module. In this configuration, the membrane liquid 62a, 62b can only enter the cartridge 51 between the feed and permeant channel(s) which are wound around the core tube 52. This results in a membrane liquid flow in a cross-flow direction with respect to both the feed fluid and the purge fluid as depicted in FIG. 8. The membrane liquid flow shown in FIG. 9 is cocurrent to the feed fluid and countercurrent to the purge fluid.

Each port on the module contains a seal 74, 75, 76, 77, 78, 79 on the outside of the housing. Also, as in the first embodiment, a pump or compressor 63, 64 may be needed in both the permeant-depletion channel and the permeant-enrichment channel to transport fluids in and through the module. The module also includes pressure controllers 65, 66 and regulators 67, 68, 69 between the purge fluid 59a, 59b channel and the membrane liquid 62a, 62b and the membrane liquid and feed fluid 58a, 58b channel. The membrane liquid circulation system 80 includes a liquid pump 81, membrane liquid reservoir 82, circulation bypass 83 and pressure regulators, 84, 85, 86, 87.

Depending upon the separation conditions and requirements, feed and purge/strip fluid can be countercurrent or cocurrent. In the case of a countercurrent flow, the feed and purge fluids enter and exit the membrane cartridge on the opposite ends of the core tube. While in the cocurrent case, they enter and exit on the same end of the core tube.

The flow patterns of feed fluid, purge/strip fluid and membrane liquid are shown in FIG. 8, in which feed 58a, 58b and purge/strip 59a, 59b fluids are countercurrent to each other, and membrane liquid 62a, 62b is in cross-flow direction with respect to both the feed and purge/strip flows. The feed 105a, 105b and purge 104a, 104b tubes are divided in the middle by either center plugs 120, 121 or the solid stock of the core tube to prevent direct fluid communication between the two tube halves.

The feed and purge/strip fluids distribute into their respective channels through a number of openings 122–124, 125–127 on one half 105a, 104a of each tube and return through similar openings 131–133, 128–130 on the other half 105b, 104b of each tube. This flow pattern is dictated by the placement of an adhesive on the edges 134, 135 of the feed and purge fluid spacers 136, 137 and in line with the center plug in the core tube at 138, 139. When the spacers are wrapped around the tube, the adhesives seal the fluid channels and the feed or purge fluid is forced to flow in the illustrated manner. The membrane liquid flows in the channel between the feed and purge fluid channels and does not communicate with these fluids due to the seal created by the adhesive.

Double-coated adhesive tapes or a heat sealing device may also be used to seal the edges. However, the preferred method of sealing is to place an adhesive in a 2" strip along the edges and the end of the purge and feed fluid spacers which are between 36" and 96" in length and 20" and 60" in width. A center strip of adhesive is arranged on the spacer to extend from the core tube from about 30" to 80" in direct alignment with the solid center or tube plug.

FIG. 9 shows an alternative flow pattern in which the membrane liquid flow 62a, 62b is cocurrent to the feed fluid flow 58a, 58b and countercurrent to the purge fluid flow 59a, 59b. The feed 105a, 105b and purge 104a, 104b tubes are separated by either a center plug or the center of the core tube 52 to prevent direct fluid communication between the two tube halves.

The feed and purge/strip fluids distribute into their respective channels through a number of openings 140–141, 146–147 on one half 105a, 104a of the each tube and return through similar openings 144–145, 142–143 on the other half 105b, 104b of each tube. The feed and purge fluid channels are defined by a tight mesh screen 150, 151 placed on top of a loose mesh screen 152, 153. This construction provides significant structural stability without sacrificing permeability.

As in FIG. 8, the flow pattern of the embodiment of FIG. 9 is dictated by the placement of an adhesive on the edges 148, 149 of the tight and loose mesh screens to form independent feed and purge fluid channels. Again, the membrane liquid flows in the channel between the feed and purge fluid channels and does not communicate with these fluids due to the seal created by the adhesive.

Preferably, the adhesive is placed in a 2" strip along the edges and the end of the purge and feed fluid channels which, in the embodiment of FIG. 9, are between 36" and 96" in width and 20" and 60" in length.

The spiral wound module operates in a manner similar to the tubular or hollow fiber module as discussed above. That is, a moving liquid membrane is established by continuously and simultaneously passing the feed fluid, purge fluid, and membrane liquid through their respective independent channels. The purge and feed fluids may be supplied in a cocurrent or counter-current fashion. In addition, a set quantity of the feed and purge fluids may be continuously cycled through the module, or the module may be operated in the "once through mode".

Finally, as in the tubular module, the spiral wound module may be operated by closing the purge fluid inlet port and using no purge fluid. In this mode, the purge fluid outlet port may be connected to a vacuum pump and/or a condenser to draw the permeant out of the module from the permeant enrichment channels.

It is not intended to limit the present invention to the specific embodiments disclosed above. It is appreciated that many variations and alterations of the foregoing can be made without deviating from the scope and teachings of the present invention. For example, a plurality of spiral wound cartridges may be arranged in a housing to form a Spiral Wound Module, or the purge/strip and feed fluid inputs/outputs may be interchanged in the Tubular or Hollow Fiber Module. It is intended to encompass all other embodiments, alternatives and modifications consistent with the present invention.

What is claimed is:

1. A spiral wound moving liquid membrane module for separating a permeant from a feed fluid mixture, said module comprising:

a housing, said housing adapted to contain a spiral wound moving liquid membrane cartridge, said cartridge comprising
      a core tube having a first and a second end,
      a feed fluid channel wrapped around said core tube,
      a purge fluid channel wrapped around said core tube, and
      a membrane fluid channel wrapped around said core tube between said purge fluid channel and said feed fluid channel;

at least two ports extending from each end of said core tube, one of said ports on each end of said core tube being a feed fluid port in fluid communication with said feed fluid channel, and one of said ports on each end of said core tube being a purge fluid port in fluid communication with said purge fluid channel;

a membrane liquid intake port connected to said housing into a membrane liquid intake manifold, said membrane liquid intake manifold being between said housing and a first end of said cartridge, and being in fluid communication with said membrane fluid channel; and at least one pump or compressor connected at least one of said purge fluid ports, at least one of said feed fluid ports, and said membrane liquid intake port, said at least one pump or compressor being adapted to provide independent and simultaneous flowing of a purge fluid through said purge fluid channel, a feed fluid through said feed fluid channel, and a membrane liquid into said membrane liquid channel through said membrane liquid intake manifold.

2. A spiral wound moving liquid membrane module according to claim 1, said module further comprising at least one pump or condenser connected to one of said purge fluid ports for drawing said permeant out of said module.

3. A spiral wound moving liquid membrane module according to claim 1, said module further comprising at least one combination of a pump and a condenser connected to one of said purge fluid ports for drawing said permeant out of said module.

4. A spiral wound moving liquid membrane module according to claim 1, said module further comprising:

a membrane liquid outlet port connected to said housing into a membrane liquid outlet manifold, said membrane liquid outlet manifold being defined by a space between said housing and said second end of said core tube and being in fluid communication with said membrane fluid channel.

5. A spiral wound moving liquid membrane module according to claim 1, said module further comprising:

a first end seal located on a first end of said cartridge, said first end seal extending between the housing and the exterior surface of said cartridge, said membrane liquid intake manifold being defined by a space between said first end seal and a first end of said housing;

a second end seal located on a second end of said cartridge, said second end seal extending between said housing and the exterior surface of said cartridge; and a space between said second end seal and a second end of said housing, said space defining a membrane liquid outlet manifold for removing said membrane liquid from said module through a membrane liquid outlet port.

6. A spiral wound moving liquid membrane module according to claim 1, said module further comprising at least two pressure regulators, one of said pressure regulators connected between the membrane fluid channel and the purge fluid channel, and the other of said pressure regulators connected between the membrane fluid channel and the feed fluid channel for controlling a differential pressure between the feed fluid and the membrane liquid, and between the membrane liquid and the purge fluid.

7. A spiral wound moving liquid membrane module according to claim 1, wherein said core tube is formed from solid rod stock and comprises a purge fluid tube and a feed fluid tube formed integrally therein.

8. A spiral wound moving liquid membrane module according to claim 1, wherein said core tube comprises a core tube template with a purge fluid tube and a feed fluid tube extending therethrough.

9. A spiral wound moving liquid membrane module according to claim 1, wherein said core tube comprises a core tube template with two or more independent purge fluid tubes and an equal number of independent feed fluid tubes inserted therein in a circumferentially alternating fashion, and wherein purge and feed fluid channels in communication with said independent purge and feed fluid tubes, respectively, are wrapped around said core with screen spacers between said purge and feed fluid channels to form said membrane fluid channel between each purge fluid channel and feed fluid channel.

10. A spiral wound moving liquid membrane module separating a permeant from a feed fluid mixture, said module comprising:

a housing, said housing adapted to contain a spiral wound moving liquid membrane cartridge, said cartridge comprising a core tube having a first and a second end, a feed fluid channel wrapped around said core tube, a purge fluid channel wrapped around said core tube, and a membrane fluid channel wrapped around said core tube between said purge fluid channel and said feed fluid channel;

at least two tubular fluid ports extending from a first end of the housing to first end of the core tube, and at least two tubular fluid ports extending from a second end of the housing to the second end of the core tube, at least one of said ports at each end of the housing being a feed fluid port in fluid communication with the feed fluid channel, and the other of said ports on each end of the housing being purge fluid ports in fluid communication with the purge fluid channel;

a membrane liquid intake port connected to said housing at a first end of said cartridge;

at least one pump or compressor connected to at least one of said purge fluid ports, at least one of said feed fluid ports, and said membrane liquid intake port, said at least one pump or compressor for providing independent and simultaneous flowing of a purge fluid through said purge fluid channel, a feed fluid through said feed fluid channel, and a membrane liquid through said membrane liquid channel;

an end seal located on an end of said cartridge, said end seal extending between said housing and an exterior surface of said cartridge; and an antitelescoping device fixed to said end seal for preventing cartridge from telescoping under force of independent and simultaneous flowing of said membrane liquid and said purge and feed fluids.

* * * * *